(12) United States Patent  (10) Patent No.: US 8,989,097 B2
Wang et al.  (45) Date of Patent: Mar. 24, 2015

(54) MULTI-ANTENNA DIVERSITY SCHEDULING METHOD AND APPARATUS

(71) Applicant: Huawei Technologies Co., Ltd., Shenzhen (CN)

(72) Inventors: Yi Wang, Shenzhen (CN); Xiaoyan Bi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 13/763,170

(22) Filed: Feb. 8, 2013

(65) Prior Publication Data

US 2013/0148608 A1  Jun. 13, 2013

Related U.S. Application Data

(63) Continuation of application No. PCT/CN2011/075264, filed on Jun. 3, 2011.

(30) Foreign Application Priority Data

Aug. 13, 2010  (CN) .......................... 2010 1 0255535

(51) Int. Cl.
*H04W 4/00* (2009.01)
*H04W 72/08* (2009.01)
*H04B 17/00* (2006.01)
*H04W 72/12* (2009.01)
*H04B 7/06* (2006.01)

(52) U.S. Cl.
CPC ......... *H04W 72/085* (2013.01); *H04B 17/0077* (2013.01); *H04W 72/1226* (2013.01); *H04B 7/0632* (2013.01); *H04B 7/0684* (2013.01)
USPC ............ 370/328; 370/210; 370/344; 375/267

(58) Field of Classification Search
None
See application file for complete search history.

(56) References Cited

U.S. PATENT DOCUMENTS

| 8,675,481 B2 * | 3/2014 | Ko et al. ....................... 370/229 |
| 2007/0135139 A1 | 6/2007 | Avidor et al. |
| 2008/0049791 A1 | 2/2008 | Tirkkonen et al. |

(Continued)

FOREIGN PATENT DOCUMENTS

| CN | 101536359 A | 9/2009 |
| CN | 101772913 A | 7/2010 |

(Continued)

OTHER PUBLICATIONS

International Search Report issued in corresponding PCT Patent Application No. PCT/CN2011/075264, mailed Sep. 8, 2011.

(Continued)

*Primary Examiner* — Bob Phunkulh
(74) *Attorney, Agent, or Firm* — Brinks Gilson & Lione

(57) ABSTRACT

The present invention provides a multi-antenna diversity scheduling method and apparatus. The method includes: transmitting pilot signals through x transmit antennas, where pilot signals on 1 to x−1 transmit antennas are a product of pilot symbols and a phase sequence, the phase sequence changes with at least one of time and frequency, the phase sequence changes more frequently than a user channel, and x is a positive integer greater than or equal to 2; receiving a transient channel quality information (CQI) value returned by a user according to the pilot signals; and according to the CQI value and a scheduling algorithm, scheduling the user to transmit data.

8 Claims, 7 Drawing Sheets

(56) References Cited

U.S. PATENT DOCUMENTS

| | | |
|---|---|---|
| 2008/0117999 A1 | 5/2008 | Kadous et al. |
| 2009/0080402 A1* | 3/2009 | Imamura ................ 370/343 |
| 2009/0081967 A1* | 3/2009 | Imamura ................ 455/101 |
| 2009/0086838 A1* | 4/2009 | Imamura ................ 375/260 |
| 2009/0135940 A1* | 5/2009 | Imamura ................ 375/267 |
| 2009/0185533 A1* | 7/2009 | Kim et al. ................ 370/329 |
| 2009/0197546 A1* | 8/2009 | Kim et al. ................ 455/101 |
| 2010/0120388 A1* | 5/2010 | Imamura ................ 455/205 |
| 2010/0220685 A1 | 9/2010 | Suda et al. |
| 2010/0254326 A1* | 10/2010 | Sawahashi et al. ........ 370/329 |
| 2011/0096852 A1 | 4/2011 | Kimura et al. |
| 2011/0205930 A1* | 8/2011 | Rahman et al. ................ 370/252 |
| 2012/0093120 A1* | 4/2012 | Ko et al. ................ 370/329 |

FOREIGN PATENT DOCUMENTS

| | | |
|---|---|---|
| CN | 101800570 A | 8/2010 |
| WO | WO 2009128276 A1 | 10/2009 |

OTHER PUBLICATIONS

Written Opinion of the International Searching Authority issued in corresponding PCT Patent Application No. PCT/CN2011/075264, mailed Sep. 8, 2011.

* cited by examiner

MULTI-ANTENNA DIVERSITY SCHEDULING METHOD AND APPARATUS

CROSS-REFERENCE TO RELATED APPLICATIONS

This application is a continuation of International Application No. PCT/CN2011/075264, filed on Jun. 3, 2011, which claims priority to Chinese Patent Application No. 201010255535.5, filed on Aug. 13, 2010, both of which are hereby incorporated by reference in their entireties.

FIELD OF TECHNOLOGY

The present invention relates to the communication field, and in particular, to a multi-antenna diversity scheduling method and apparatus in a multi-user environment.

BACKGROUND OF THE INVENTION

Currently, in the radio communication field, the multi-antenna diversity technology is developing rapidly. For example, space-time coding technologies such as space-time block coding (Space-Time Block Coding, STBC) and space-time transmit diversity (Space-Time Transmit Diversity, STTD) are multi-antenna diversity technologies specific to point-to-point links. However, such technologies are primarily intended to increase diversity gain of the point-to-point links, and it is very difficult to accomplish multi-user diversity gain in a multi-user environment.

The multi-user diversity gain enables not only selecting when to transmit data, but also selecting one or more users who will transmit the data, and selecting power allocation between users in the multi-user environment. The performance gain unavailable from a point-to-point environment but available from such additional selections is multi-user diversity gain.

An Alamouti scheme is a typical multi-antenna diversity technology currently applied in the multi-user environment. The scheme includes: multiple users in a system measure a transient channel quality information (Channel Quality Information, CQI) value in a scheduling subband through pilot signals, and then feed back the transient CQI value through an uplink channel to an Evolved Universal Terrestrial Radio Access Network NodeB (E-UTRAN NodeB, eNB), and finally, the eNB uses a scheduling algorithm to schedule the users. Examples of common scheduling algorithms include maximum channel quality information scheduling (Max-CQI scheduling) and proportional fair scheduling (Proportional Fair scheduling, PF scheduling).

For example, with the Max-CQI algorithm, the eNB invokes the user having the highest CQI value to transmit data. In this way, when the user channel fluctuates slowly, the eNB always schedules one or more users with the best channel quality. Therefore, the scheduling fairness is not ensured in the multi-user environment.

As another example, with the PF algorithm, the eNB performs scheduling according to the value of a parameter k of the user. With a greater value of k, the user is more likely to be scheduled. The value of k is a result of dividing the CQI value of the user at the current time by the amount of data transmitted when the user is previously scheduled. Evidently, if the user has been scheduled for many times, the value of k diminishes, and the user will not be scheduled again. This algorithm ensures the scheduling fairness, but leads to a huge loss of system capacity because the scheduled user is not necessarily the user who has the best channel quality currently. Scheduling the user with the best current channel quality is a linchpin of ensuring the system capacity.

Therefore, in the multi-user environment in the prior art, if the user channel changes slowly, the system capacity is ensured maximally at the cost of the system fairness, and the system fairness is ensured at the cost of the system capacity. That is, in the prior art, it is very hard to keep a balance between the maximized system capacity and the user scheduling fairness.

SUMMARY OF THE INVENTION

Embodiments of the present invention provide a multi-antenna diversity scheduling method and apparatus to ensure a balance between the maximized system capacity and the user scheduling fairness when the user channel changes slowly in a multi-user environment.

On the one hand, a multi-antenna diversity scheduling method provided in an embodiment of the present invention includes: transmitting pilot signals through x transmit antennas, where pilot signals on 1 to x−1 transmit antennas are a product of pilot symbols and a phase sequence, wherein the phase sequence changes with at least one of time and frequency, the phase sequence changes more frequently than a user channel, and a is x positive integer greater than or equal to 2; receiving a transient CQI value returned by a user according to the pilot signals; and according to the transient CQI value and a scheduling algorithm, scheduling the user to transmit data.

Further, a multi-antenna diversity scheduling apparatus provided in another embodiment of the present invention includes: x transmit antennas, configured to transmit pilot signals; a channel adjusting unit, configured to multiply pilot symbols by a phase sequence, and then transmit them through 1 to x−1 transmit antennas to a user, where the phase sequence changes with at least one of time and frequency, the phase sequence changes more frequently than a user channel, and x is a positive integer greater than or equal to 2; a CQI receiving unit, configured to receive a transient channel quality information (CQI) value returned by the user according to the pilot signals; and a scheduling unit, configured to, according to the transient CQI value and a scheduling algorithm, schedule the user to transmit data.

In the embodiments of the present invention, the phase sequence is used on the transmit antennas to transmit pilot signals. Therefore, greater and faster channel fluctuation is introduced to the user channel, and a balance is achieved between the maximized system capacity and the user scheduling fairness at the time of scheduling users through the scheduling algorithm.

BRIEF DESCRIPTION OF THE DRAWING(S)

To describe the technical solutions in the embodiments of the present invention or in the prior art more clearly, the following outlines the accompanying drawings used in description of the embodiments of the present invention or the prior art. Apparently, the accompanying drawings are illustrative rather than exhaustive, and persons of ordinary skill in the art can derive other drawings from them without any creative effort.

DETAILED DESCRIPTION OF THE EMBODIMENTS

The following detailed description is given in conjunction with the accompanying drawings of embodiments of the present invention to provide a thorough understanding of the technical solutions of embodiments of the present invention. Evidently, the drawings and the detailed description are merely representative of some particular embodiments of the present invention rather than all embodiments. All other embodiments, which can be derived by persons of ordinary skill in the art from the embodiments of the present invention without any creative effort, should fall within the protection scope of the present invention.

Figure 1:
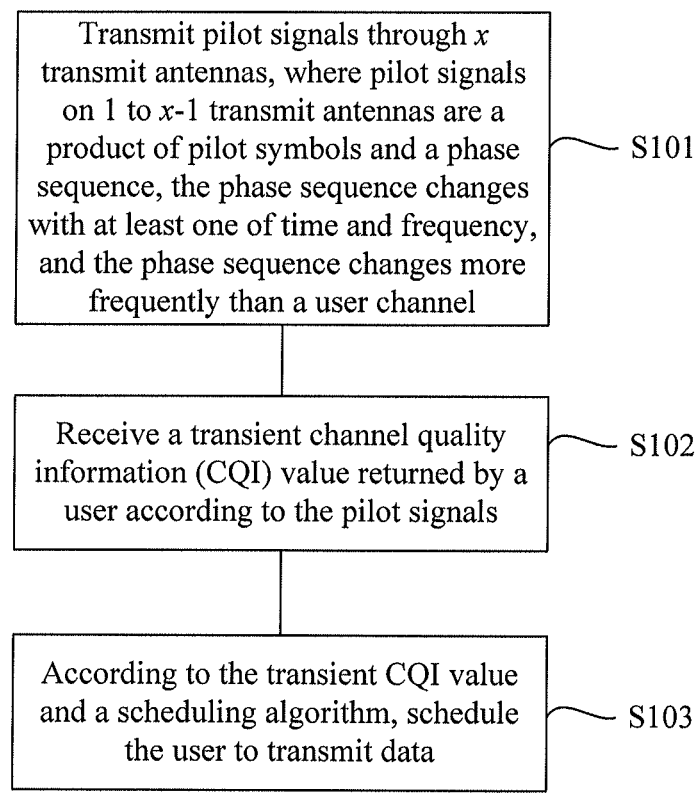
FIG. 1 is a schematic flowchart of a multi-antenna diversity scheduling method according to an embodiment of the present invention.

FIG. 1 is a schematic flowchart of a multi-antenna diversity scheduling method according to an embodiment of the present invention. Understandably, this embodiment is described from the perspective of the eNB. The method includes:

S101. Transmit pilot signals through x transmit antennas, where pilot signals on 1 to x−1 transmit antennas are a product of pilot symbols and a phase sequence, the phase sequence changes with at least one of time and frequency, the phase sequence changes more frequently than a user channel, remaining antennas transmit pilot symbols, and x is a positive integer greater than or equal to 2.

In this embodiment, the pilot signals are transmitted so that the user can measure the transient CQI values according to the pilot signals, whereupon the eNB can decide a scheduling scheme according to these CQI values. The eNB uses the multiple antennas to transmit data so as to increase the diversity gain for the point-to-point link.

In this embodiment, 1 to x−1 antennas in the x antennas are used as adjustment antennas. The functions of the adjustment antennas are to adjust fluctuation of the user channel. The pilot signals transmitted from the adjustment antennas are a product of pilot symbols and a phase sequence, and the phase sequence changes with at least one of time and frequency. Therefore, the change of the phase sequence makes the CQI value measured by the user change correspondingly. In this way, the fluctuation of the user channel can be adjusted through the phase sequence. When the phase sequence changes more frequently than the user channel, the fluctuation of the user channel becomes faster and greater. Preferably, x−1 antennas are used as the adjustment antennas.

S102. Receive a transient channel quality information (CQI) value returned by a user according to the pilot signals.

Upon receiving the pilot signals in step S101, the user uses a CQI formula to calculate the transient CQI value according to the pilot signals, and then feeds back the transient CQI value to the eNB through the uplink control channel.

S103. According to the transient CQI value and a scheduling algorithm, scheduling the user to transmit data.

For example, the scheduling algorithm may be MAX-CQI scheduling algorithm or PF scheduling algorithm.

When the scheduling algorithm is MAX-CQI, it is assumed that the eNB performs scheduling 10 times in 10 ms in this embodiment. Because the user channel changes very slowly or seldom changes within 10 ms, only one or a few users with high channel quality are scheduled through the 10 attempts of scheduling, which ensures the system capacity but lacks fairness. After faster and greater fluctuation is applied through a phase sequence, users with high channel quality are still scheduled through the 10 attempts of scheduling by the eNB, but the users are diverse, which ensures fairness very well. Understandably, in this embodiment, the phase sequence changes more frequently than the user channel, but its most appropriate value can be obtained through emulation.

When the scheduling algorithm is PF, the nature of this algorithm makes it certain that the fairness is ensured. By use of greater and faster channel fluctuation, the channel of the scheduled user approaches the peak value more probably, and therefore, the system capacity is ensured to some extent.

Nevertheless, the embodiment is not limited to the two scheduling methods above. In other scheduling methods, by use of greater and faster fluctuation of the user channel also brings similar performance gain.

In this embodiment, a phase sequence is used on the transmit antennas to transmit pilot signals. Therefore, greater and faster channel fluctuation is introduced to the user channel, and a balance is achieved between the maximized system capacity and the user scheduling fairness at the time of scheduling users through a scheduling algorithm.

Figure 2:
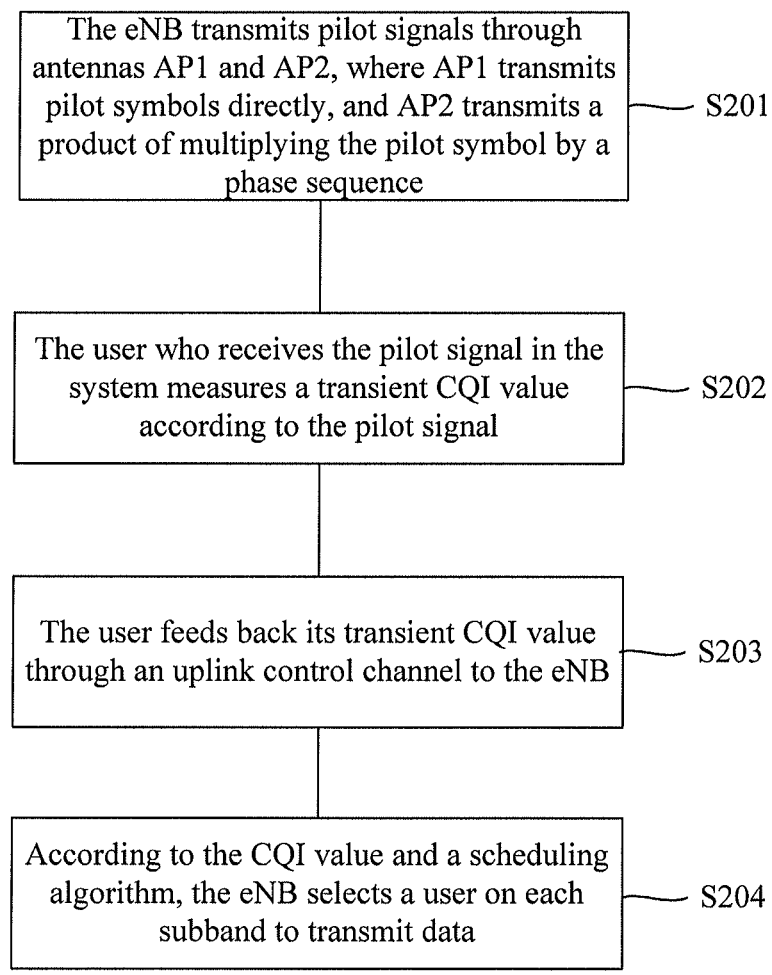
FIG. 2 is a schematic flowchart of another multi-antenna diversity scheduling method according to an embodiment of the present invention.

The following describes the foregoing embodiment in more detail through an instance. FIG. 2 is a schematic flowchart of another multi-antenna diversity scheduling method according to an embodiment of the present invention. In this embodiment, it is assumed that the number of transmit antennas on the eNB side is 2, and the system uses an OFDM modulation mode. The method of this embodiment includes:

S201. The eNB transmits pilot signals through antennas AP1 and AP2. AP1 transmits pilot symbols directly, and AP2 multiplies a pilot symbol by a phase sequence and then transmits the product. Specifically, the signal transmitted from the two antennas is $$\frac{1}{\sqrt{2}} \begin{bmatrix} 1 \\ \exp\left(j\left(\theta_n + \frac{2\pi m\tau}{N}\right)\right) \end{bmatrix} s[m, n],$$

where $$\begin{bmatrix} 1 \\ \exp\left(j\left(\theta_n + \frac{2\pi m\tau}{N}\right)\right) \end{bmatrix}$$

is a 2-column matrix, s[m,n] is a pilot symbol on subcarrier m at the $n^{th}$ orthogonal frequency division multiplexing (Orthogonal Frequency Division Multiplexing, OFDM) pilot slot, $$\exp\left(j\left(\theta_n + \frac{2\pi m\tau}{N}\right)\right)$$

is a phase sequence, $\theta_n$ is a sequence that changes with time periodically within $[-\pi,\pi]$, $\tau$ is a cyclic delay, and N is the number of inverse fast Fourier transformation (IFFT) points. In this embodiment, the change frequency $f_m$ of $\theta_n$ is faster than that of the user channel, and the best value of $f_m$ may be selected according to the emulation result.

The $\theta_n$ in the phase sequence $$\exp\left(j\left(\theta_n + \frac{2\pi m\tau}{N}\right)\right)$$

reveals that the phase sequence changes with time. The phase sequence may be generated randomly or changes regularly on the time domain, for example, . . . $\theta_n = 2\pi f_m$, $\theta_n$ changes with time in the range from 0 to $2\pi$, or a random phase sequence is generated first, and the sequence may be known to the user and the eNB in a standardized mode. Further, $$\frac{2\pi m\tau}{N}$$

in the phase sequence $$\exp\left(j\left(\theta_n + \frac{2\pi m\tau}{N}\right)\right)$$

reveals that the phase sequence changes with frequency. On the frequency domain, the phase sequence is a linear sequence of the sequence number of the subcarrier or a linear sequence of the subcarrier group. For example, if m is the sequence number of the subcarrier, the phase sequence changes with the subcarrier; if m is a sequence number of a physical resource block (Physical Resource Block, PRB) (for example, in an LTE system, a PRB is composed of 12 subcarriers), the phase sequence changes with the sequence number of the PRB, but keeps unchanged within a PRB.

S202. The user who receives the pilot signal in the system measures the transient CQI value according to the pilot signal. The transient CQI value of the $k^{th}$ user in a subband is:

$$CQI_k = \frac{P_t}{\sigma^2} \frac{1}{N_{RE}} \sum_m \sum_n \left| h_k^{(1)}[m,n] + h_k^{(2)}[m,n]\exp\left(j\left(\theta_n - \frac{2\pi m\tau}{N}\right)\right) \right|^2,$$

where $P_t$ is the power of the transmitted signal, $\sigma^2$ is a variance, $N_{RE}$ is the number of resource blocks in a scheduling subband, and $h_k^{(1)}[m,n]$ and $h_k^{(2)}[m,n]$ are channel estimation values from two transmit antennas to the receive antennas respectively.

S203. The user feeds back its transient CQI value through an uplink control channel to the eNB.

S204. According to the CQI value and a scheduling algorithm, the eNB selects a user on each subband to transmit data.

When the eNB employs a MAX-CQI algorithm, if K users participate in the scheduling, the MAX-CQI algorithm is $$k_* = \underset{k}{\operatorname{argmax}}\, CQI_k.$$

That is, the user with the maximum CQI in the system is selected for transmitting data. In this case, because greater and faster fluctuation of the user channel is applied, the fairness is ensured.

When the eNB employs a PF scheduling algorithm, the scheduling algorithm is $$k_* = \underset{k}{\operatorname{argmax}}\, \frac{R_k(t)}{T_k(t)},$$

where $R_k(t)$ is the data rate currently supported by the $k^{th}$ user, and is obtained according to the transient $CQI_k$ of the $k^{th}$ user, and $T_k(t)$ is an average rate of the $k^{th}$ user in the time window $T_w$. Evidently, with more frequent scheduling in the time window $T_w$, the average rate of the user is higher (namely, the amount of transmitted data is larger), and the user will not be scheduled, thereby ensuring fairness. Meanwhile, the use of faster and greater fluctuation of the user channel ensures the system capacity.

Nevertheless, the embodiment is not limited to the two scheduling methods above. In other scheduling methods, the use of greater and faster fluctuation of the user channel also brings similar performance gain.

Understandably, although the scenario of two antennas is used as an example in the description of this embodiment, those skilled in the art should know that the method described in this embodiment also fulfills the technical objectives of the present invention when more than two antennas are applied.

For example, when x (x>2) antennas are applied and x−1 antennas are adjustment antennas, the transmitted signals on x antennas in step S201 may change to:

$$\frac{1}{\sqrt{a}} \begin{bmatrix} 1 \\ \exp\left(j\left(\theta_n + \frac{2\pi m\tau}{N}\right)\right) \\ \vdots \\ \exp\left(j\left(\theta'_n + \frac{2\pi m\tau'}{N}\right)\right) \end{bmatrix} s[m,n],$$

where the content embraced in the square brackets is a matrix with x rows, and $$\exp\left(j\left(\theta_n + \frac{2\pi m\tau}{N}\right)\right) \ldots \exp\left(j\left(\theta'_n + \frac{2\pi m\tau'}{N}\right)\right)$$

are phase sequences multiplied on x−1 antennas respectively; when the number of adjustment antennas is x−2, the formula is the same except that $$\exp\left(j\left(\theta_n + \frac{2\pi m\tau}{N}\right)\right)$$

of the foregoing matrix is replaced with 1; when the number of adjustment antennas is another number, the expression can be deduced similarly.

If x−1 antennas are adjustment antennas, the CQI calculation formula in step S202 changes to:

$$CQI_k = \frac{P_t}{\sigma^2} \frac{1}{N_{RE}} \sum_m \sum_n \left| h_k^{(1)}[m,n] + h_k^{(2)}[m,n]\exp\left\{j\left(\theta_n - \frac{2\pi m\tau}{N}\right)\right\} \ldots + h_k^{(a)}[m,n]\exp\left\{j\left(\theta'_n - \frac{2\pi m\tau'}{N}\right)\right\} \right|^2,$$

where $h_k^{(1)}[m,n]$, $h_k^{(2)}[m,n]$, ..., $h_k^{(a)}[m,n]$ are channel estimation values from x transmit antennas to receive antennas, m,n represents a symbol on subcarrier number m and orthogonal frequency division multiplexing (OFDM) n, $N_{RE}$ is the number of resource blocks in a scheduling subband, $P_t$ is the power of the transmitted signal, $\sigma^2$ is a variance, $\theta'_n$ is a sequence that changes with time periodically within $[-\pi,\pi]$, $\tau'$ is a cyclic delay, and $$\exp\left(j\left(\theta_n + \frac{2\pi m\tau}{N}\right)\right), \ldots, \exp\left(j\left(\theta'_n + \frac{2\pi m\tau'}{N}\right)\right)$$

represent phase sequences multiplied on x−1 antennas respectively.

Other steps are the same correspondingly.

It should be noted that in the formula above, $\theta'_n$ and $\tau'$ may be the same as or different from $\theta_n$ and $\tau$. That is, the phase sequence multiplied on each antenna may change with time and frequency to the same extent or different extents.

In this embodiment, a phase sequence is used on the transmit antennas to transmit pilot signals. Therefore, greater and faster channel fluctuation is introduced to the user channel, and a balance is achieved between the maximized system capacity and the user scheduling fairness at the time of scheduling users through a scheduling algorithm.

Figure 3:
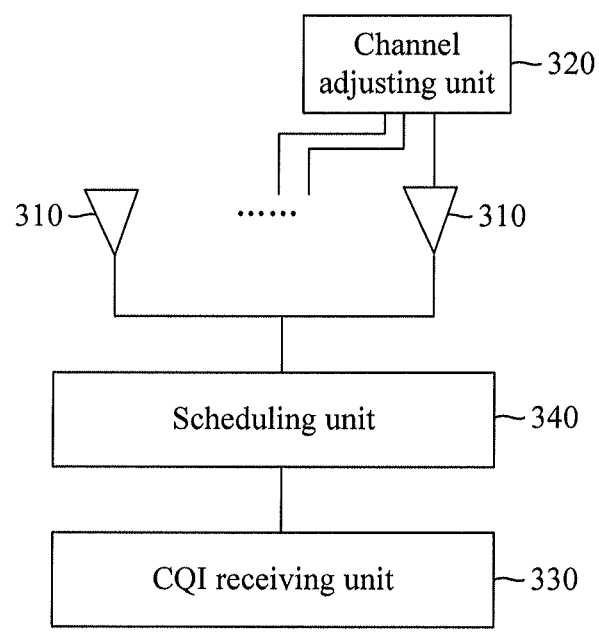
FIG. 3 is a schematic structural diagram of a multi-antenna diversity scheduling apparatus according to an embodiment of the present invention.

FIG. 3 is a schematic structural diagram of a multi-antenna diversity scheduling apparatus according to an embodiment of the present invention. The apparatus is located on the eNB side, and includes: x transmit antennas 310, a channel adjusting unit 320, a CQI receiving unit 330, and a scheduling unit 340, where x is a positive integer greater than or equal to 2.

The transmit antennas 310 are configured to transmit pilot signals. In this embodiment, the transmit antennas 310 are further configured to transmit other radio data between the eNB and the user. Using multiple antennas to transmit data can increase diversity gain for point-to-point links.

The channel adjusting unit 320 is configured to multiply pilot symbols by a phase sequence, and then transmit them through 1 to x−1 transmit antennas 310 to a user, where the phase sequence changes with at least one of time and frequency, and the phase sequence changes more frequently than a user channel.

In this embodiment, x−1 antennas in the x antennas are used as adjustment antennas. The functions of the adjustment antennas are to adjust fluctuation of the user channel. The pilot signals transmitted from the adjustment antennas are a product of pilot symbols and a phase sequence, and the phase sequence changes with at least one of time and frequency. Therefore, the change of the phase sequence makes the CQI value measured by the user change correspondingly. In this way, the fluctuation of the user channel can be adjusted through the phase sequence. When the phase sequence changes more frequently than the user channel, the fluctuation of the user channel becomes faster and greater. Preferably, x−1 antennas are used as adjustment antennas.

In this embodiment, the channel adjusting unit 320 delivers a product of the pilot signals and the phase sequence to multiple transmit antennas 310. The phase sequences delivered to different transmit antennas 310 may be the same or different. Besides, the channel adjusting unit 320 may be separately provided for each transmit antenna 310 that requires the phase sequence.

The CQI receiving unit 330 is configured to receive a transient channel quality information (CQI) value returned by the user according to the pilot signals. Specifically, the CQI receiving unit 330 receives the transient CQI value through an uplink control channel.

The scheduling unit 340 is configured to: according to the transient CQI value and a scheduling algorithm, schedule the user to transmit data. As an embodiment of the present invention, the scheduling algorithm may be MAX-CQI scheduling algorithm, or PF scheduling algorithm, or another scheduling algorithm.

In this embodiment of the present invention, the phase sequence is used on the transmit antennas to transmit pilot signals. Therefore, greater and faster channel fluctuation is introduced to the user channel, and a balance is achieved between the maximized system capacity and the user scheduling fairness at the time of scheduling users through a scheduling algorithm.

Figure 4:
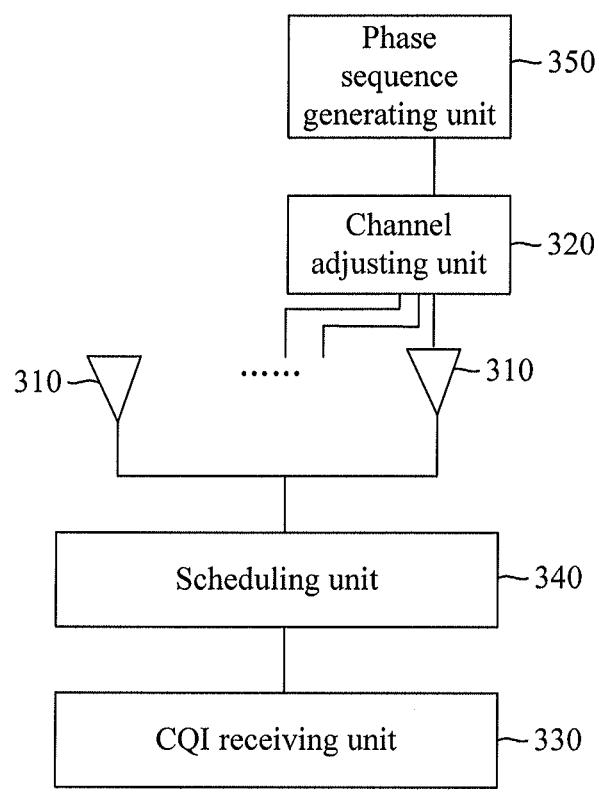
FIG. 4 is a schematic structural diagram of another multi-antenna diversity scheduling apparatus according to an embodiment of the present invention.

FIG. 4 is a schematic structural diagram of another multi-antenna diversity scheduling apparatus according to an embodiment of the present invention. The apparatus is located on the eNB side, and includes: x transmit antennas 310, a channel adjusting unit 320, a CQI receiving unit 330, a scheduling unit 340, and a phase sequence generating unit 350.

The phase sequence generating unit 350 is configured to generate a phase sequence, and send the phase sequence to the channel adjusting unit 320. The phase sequence is $$\exp\left(j\left(\theta_n + \frac{2\pi m\tau}{N}\right)\right),$$

where $\theta_n$ is a sequence that changes with time periodically within $[-\pi,\pi]$, $\tau$ is a cyclic delay, N is the number of inverse fast Fourier transformation (IFFT) points. In this embodiment, the change frequency $f_m$ of $\theta_n$ is faster than that of the user channel, and the best value of $f_m$ may be selected according to the emulation result. For different transmit antennas, the phase sequence may be the same or different so long as its change frequency $f_m$ is faster than the change frequency of the user channel.

The $\theta_n$ in the phase sequence $$\exp\left(j\left(\theta_n + \frac{2\pi m\tau}{N}\right)\right)$$

reveals that the phase sequence changes with time. The phase sequence may be generated randomly or changes regularly on the time domain; besides, $$\frac{2\pi m\tau}{N}$$

in the phase sequence $$\exp\left(j\left(\theta_n + \frac{2\pi m\tau}{N}\right)\right)$$

reveals that the phase sequence changes with frequency, and, on the frequency domain, the phase sequence is a linear sequence of the sequence number of the subcarrier or a linear sequence of the subcarrier group.

The channel adjusting unit 320 is configured to multiply the foregoing phase sequence by a pilot symbol, whereupon the product is transmitted through a transmit antenna 310. In this embodiment, when there are two transmit antennas 310, the signals transmitted by the two transmit antennas 310 are $$\frac{1}{\sqrt{2}}\begin{bmatrix} 1 \\ \exp\left(j\left(\theta_n + \frac{2\pi m\tau}{N}\right)\right) \end{bmatrix} s[m,n],$$

where s[m,n] is a pilot symbol on subcarrier m at the $n^{th}$ orthogonal frequency division multiplexing (OFDM) pilot slot.

The CQI receiving unit 330 is configured to receive the CQI value returned by the user. In this embodiment, the transient CQI value returned by the $k^{th}$ user in a subband is:

$$CQI_k = \frac{P_t}{\sigma^2} \frac{1}{N_{RE}} \sum_m \sum_n \left| h_k^{(1)}[m,n] + h_k^{(2)}[m,n]\exp\left\{j\left(\theta_n - \frac{2\pi m\tau}{N}\right)\right\}\right|^2,$$

where $P_t$ is the power of the transmitted signal, $\sigma^2$ is a variance, $N_{RE}$ is the number of resource blocks in a scheduling subband, and $h_k^{(1)}[m,n]$ and $h_k^{(2)}[m,n]$ are channel estimation values from two transmit antennas to the receive antennas respectively.

The scheduling unit 340 is configured to: according to the transient CQI value and a scheduling algorithm, schedule the user to transmit data. In this embodiment:

When the eNB employs a MAX-CQI algorithm, if K users participate in the scheduling, the MAX-CQI algorithm is $$k_* = \operatorname*{argmax}_k \frac{R_k(t)}{T_k(t)},$$

That is, the user with the maximum CQI in the system is selected for transmitting data. In this case, because greater and faster fluctuation of the user channel is applied, the fairness is ensured.

When the eNB employs a PF scheduling algorithm, the scheduling algorithm is $$k_* = \operatorname*{argmax}_k CQI_k.$$

where $R_k(t)$ is the data rate currently supported by the $k^{th}$ user, and is obtained according to the transient $CQI_k$ of the $k^{th}$ user, and is $T_k(t)$ is an average rate of the $k^{th}$ user in the time window $T_w$. Evidently, with more frequent scheduling in the time window $T_w$, the average rate of the user is higher (namely, the amount of transmitted data is larger), and the user will not be scheduled, thereby ensuring fairness. Meanwhile, the use of faster and greater fluctuation of the user channel ensures the system capacity.

Nevertheless, the scheduling unit 340 in this embodiment is not limited to the two scheduling methods above. In other scheduling methods, the use of greater and faster fluctuation of the user channel also brings similar performance gain.

In the description above, it is assumed that two transmit antennas 310 exist. If more than two transmit antennas 310 exist, the procedure changes correspondingly. For the specific change, refer to the description in the foregoing embodiment.

In this embodiment, a phase sequence is used on one adjustment antenna to transmit pilot signals. Therefore, greater and faster channel fluctuation is introduced to the user channel, and a balance is achieved between the maximized system capacity and the user scheduling fairness at the time of scheduling users through a scheduling algorithm.

The following applies the present invention to a Long Term Evolution (Long Term Evolution, LTE) downlink for emulating, and describes the benefits of the present invention through the emulation result. The emulation parameters are shown in Table 1:

TABLE 1

| | |
|---|---|
| System bandwidth | 10 MHz |
| Number of subcarriers | 600 |
| Subcarrier interval | 15 kHz |
| Number of transmit antennas | 2 |
| Phase rotation frequency | 40 Hz |
| Channel estimation type | ideal |
| Number of users | 10 |
| Scheduling algorithm | MAX-CQI and PF scheduling algorithms (Tw = 40) performed on the time domain and frequency domain |
| Average receiving SNR | 0 dB |
| Channel model | 9-ray ITU model |
| Doppler frequency offset | 10 Hz |
| Number of receive antennas | 1 |

Figure 5:
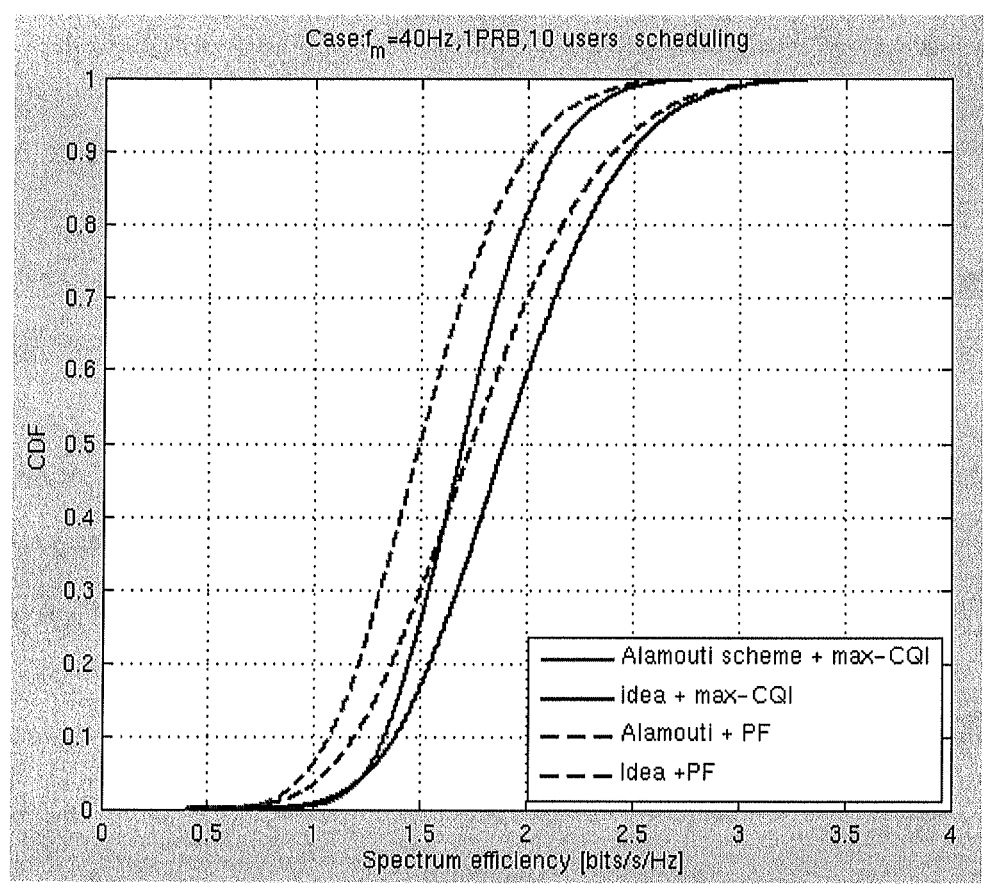
FIG. 5 is a CDF curve diagram of spectrum efficiency of each scheduling scheme in a multi-user scheduling environment according to an embodiment of the present invention.

The capacity gain and the fairness gain may be obtained according to an embodiment of the present invention and analyzed below:

1. Capacity Gain According to the Present Invention:

FIG. 5 is a cumulative distribution function (Cumulative Distribution Function, CDF) curve diagram of spectrum efficiency of each scheduling scheme in a multi-user scheduling environment according to an embodiment of the present invention. As shown in FIG. 5, no matter whether the scheduling algorithm is max-CQI or PF scheduling, the system spectrum efficiency obtained through the technical solution of the present invention is greater than that obtained through the Alamouti scheme.

Figure 6:
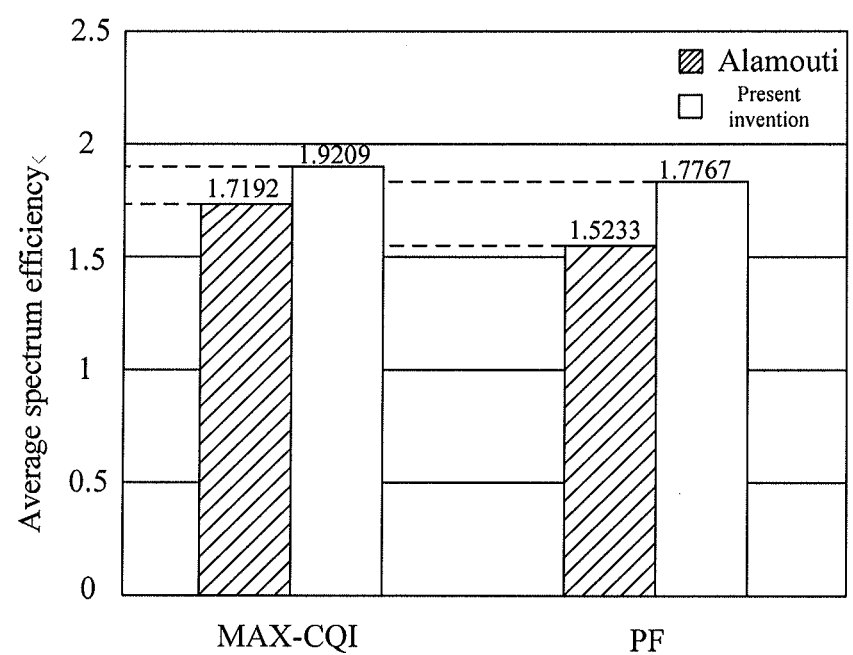
FIG. 6 is a schematic diagram an average spectrum efficiency compared between scheduling schemes according to an embodiment of the present invention.

FIG. 6 is a schematic diagram of an average spectrum efficiency compared between scheduling schemes according to an embodiment of the present invention. As shown in FIG. 6, when the MAX-CQI scheduling is applied, the average spectrum efficiency achieved in the present invention is 1.9209, but the average spectrum efficiency achieved through the Alamouti scheme is 1.7192. Therefore, the average spectrum efficiency achieved in the present invention is higher than that of the Alamouti scheme by 11.7%. When the PF scheduling is applied, the average spectrum efficiency achieved in the present invention is 1.7767, but the average spectrum efficiency achieved through the Alamouti scheme is 1.5233. Therefore, the average spectrum efficiency of the present invention is higher than that of the Alamouti scheme by 16.6%.

Therefore, compared with the Alamouti scheme, the technical solution of the present invention achieves greater capacity gain.

Figure 7:
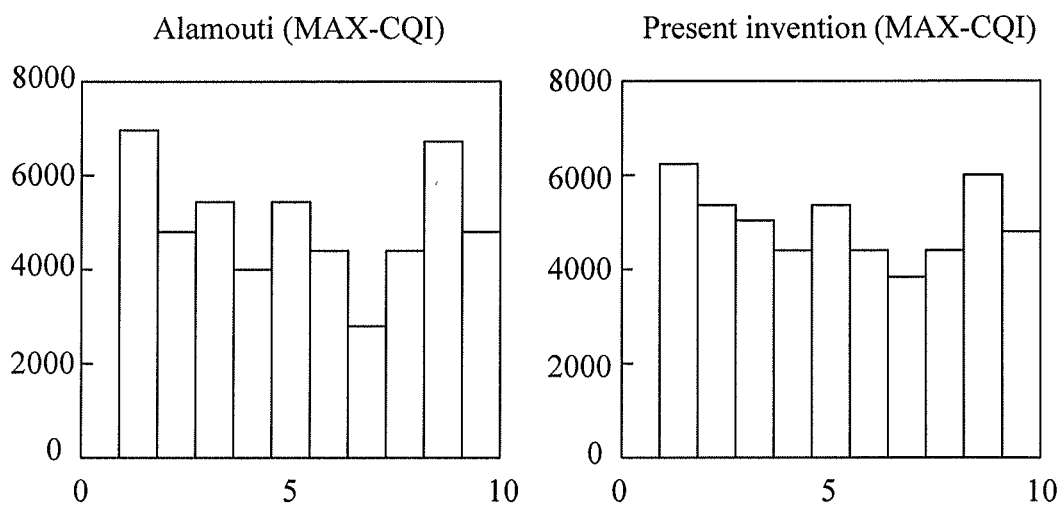
FIG. 7 is a distribution graph of number of times of scheduling each user according to an embodiment of the present invention.

2. Fairness Gain According to the Present Invention:

FIG. 7 is a distribution graph of times of scheduling each user according to an embodiment of the present invention. The x-coordinate represents a total of 10 users who participate in the scheduling in the cell; and the y-coordinate represents the number of times of scheduling each user in the survey period. Therefore, smaller fluctuation in FIG. 7 indicates better fairness of scheduling. The value in Table 2 is a result of dividing the standard deviation of the number of times of scheduling the user by the average number of times of being scheduled. It also reflects the fairness of scheduling. Smaller values indicate higher fairness.

TABLE 2

| std(n)/mean(n) | Alamouti | Present invention |
|---|---|---|
| Max-CQI scheduling | 0.2352 | 0.1517 |

As shown in FIG. 7 and Table 2, compared with the traditional multi-antenna diversity technology such as Alamouti, the technical solution of the present invention ensures the user fairness and achieves higher multi-user diversity gain in the case of multi-user scheduling.

Persons of ordinary skill in the art should understand that all or part of the steps of the method of the present invention may be implemented by a computer program instructing relevant hardware. The program may be stored in a computer readable storage medium. When the program runs, it may execute the procedures of the foregoing method embodiments. The storage medium may be a magnetic disk, CD-ROM, read-only memory (ROM) or random access memory (RAM), and so on.

The embodiments above further clarify the objectives, technical solutions and benefits of the present invention in detail. Although the invention has been described through some exemplary embodiments, the invention is not limited to such embodiments. The invention is intended to cover the modifications and variations provided that they fall in the scope of protection defined by the following claims or their equivalents.

What is claimed is:

1. A multi-antenna diversity scheduling method, comprising:

transmitting pilot signals through x transmit antennas, wherein the pilot signals on 1 to x−1 transmit antennas are a product of pilot symbols and a phase sequence, wherein the phase sequence changes with at least one of: time and frequency, wherein the phase sequence changes more frequently than a user channel, and x is a positive integer greater than or equal to 2;

receiving a transient channel quality information (CQI) value returned by a user according to the pilot signals; and according to the transient CQI value and a scheduling algorithm, scheduling the user to transmit data, wherein:

the product of the pilot symbols and the phase sequence, comprising $$\left[\exp\left(j\left(\theta_n + \frac{2\pi m\tau}{N}\right)\right)\right]s[m,n],$$

wherein s[m,n] is a pilot symbol on subcarrier m at the nth orthogonal frequency division multiplexing (OFDM) pilot slot, $$\exp\left(j\left(\theta_n + \frac{2\pi m\tau}{N}\right)\right)$$

is a phase sequence, $\theta_n$ is a sequence that changes with time periodically within $[-\pi,\pi]$, $\tau$ is a cyclic delay, and N is number of inverse fast Fourier transformation (IFFT) points;

if x−1 antennas transmit products of the pilot symbols and the phase sequence, a CQI value returned by the kth user is:

$$CQI_k = \frac{P_t}{\sigma^2}\frac{1}{N_{RE}}\sum_m\sum_n\left|h_k^{(1)}[m,n] + h_k^{(2)}[m,n]\exp\left\{j\left(\theta_n - \frac{2\pi m\tau}{N}\right)\right\} \ldots + h_k^{(a)}[m,n]\exp\left\{j\left(\theta_n' - \frac{2\pi m\tau'}{N}\right)\right\}\right|^2,$$

wherein $h_k^{(1)}[m,n]$, $h_k^{(2)}[m,n]$, ..., $h_k^{(a)}[m,n]$ are channel estimation values from x transmit antennas to receive antennas, $N_{RE}$ is number of resource blocks in a scheduling subband, $P_t$ is power of a transmitted signal, $\sigma^2$ is a variance, $\theta'_n$ is a sequence that changes with time periodically within $[-\pi,\pi]$, and $\tau'$ is a cyclic delay.

2. The method according to claim 1, wherein the phase sequence is a sequence changing with frequency, comprises:

the phase sequence is a linear sequence of subcarriers or a linear sequence of subcarrier groups on a frequency domain.

3. The method according to claim 1, wherein according to the transient CQI value and a scheduling algorithm, the scheduling of the user to transmit data, comprises:

according to the transient CQI value and a maximum channel quality information (MAX-CQI) scheduling algorithm, scheduling the user to transmit data, wherein the MAX-CQI algorithm is $$k_* = \underset{k}{\mathrm{argmax}}\, CQI_k,$$

and k represents the kth user.

4. The method according to claim 1, wherein according to the transient CQI value and a scheduling algorithm, the scheduling of the user to transmit data, comprises:

according to the transient CQI value and a proportional fairness (PF) algorithm, scheduling the user to transmit data, wherein the PF algorithm is:

$$k_* = \underset{k}{\mathrm{argmax}}\, \frac{R_k(t)}{T_k(t)},$$

wherein $R_k(t)$ is a data rate currently supported by the kth user, and related to the transient $CQI_k$ of the kth user, and $T_k(t)$ is an average rate of the kth user in a time window $T_w$.

5. A multi-antenna diversity scheduling apparatus, comprising:
x transmit antennas, configured to transmit pilot signals;
a channel adjusting unit, configured to multiply pilot symbols by a phase sequence, then transmit product through 1 to x−1 transmit antennas to a user, wherein the phase sequence changes with at least one of: and frequency, the phase sequence changes more frequently than a user channel, and x is a positive integer greater than or equal to 2;
a CQI receiving unit, configured to receive a transient channel quality information (CQI) value returned by the user according to the pilot signals; and
a scheduling unit, configured to, according to the transient CQI value and a scheduling algorithm, schedule the user to transmit data,
wherein:
a product of the pilot symbols and the phase sequence, comprising $$\left[\exp\left(j\left(\theta_n + \frac{2\pi m\tau}{N}\right)\right)\right]s[m,n],$$

wherein s[m,n] is a pilot symbol on subcarrier m at the nth orthogonal frequency division multiplexing (OFDM) pilot slot, $$\exp\left(j\left(\theta_n + \frac{2\pi m\tau}{N}\right)\right)$$

is a phase sequence, $\theta_n$ is a sequence that changes with time periodically within $[-\pi,\pi]$, $\tau$ is a cyclic delay, and N is number of IFFT points;
if x−1 antennas transmit products of the pilot symbols and the phase sequence, a CQI value returned by the kth user is:

$$CQI_k = \frac{P_t}{\sigma^2}\frac{1}{N_{RE}}\sum_m\sum_n\left|h_k^{(1)}[m,n] + h_k^{(2)}[m,n]\exp\left(j\left(\theta_n - \frac{2\pi m\tau}{N}\right)\right)\ldots + h_k^{(a)}[m,n]\exp\left(j\left(\theta'_n - \frac{2\pi m\tau'}{N}\right)\right)\right|^2,$$

wherein $h_k^{(1)}[m,n]$, $h_k^{(2)}[m,n]$, ..., $h_k^{(a)}[m,n]$ are channel estimation values from x transmit antennas to receive antennas, $N_{RE}$ is number of resource blocks in a scheduling subband, $P_t$ is power of a transmitted signal, $\sigma^2$ is a variance, $\theta'_n$ is a sequence that changes with time periodically within $[-\pi,\pi]$, and $\tau'$ is a cyclic delay.

6. The apparatus according to claim 5, further comprising:
a phase sequence generating unit, configured to generate a phase sequence, and sending the phase sequence to the channel adjusting unit, wherein the phase sequence is a linear sequence of subcarriers or a linear sequence of subcarrier groups on a frequency domain.

7. The apparatus according to claim 5, wherein according to the transient CQI value and a scheduling algorithm, the schedule of the user to transmit data, comprises:
according to the transient CQI value and a maximum channel quality information (MAX-CQI) scheduling algorithm, scheduling the user to transmit data, wherein the MAX-CQI algorithm is $$k_* = \mathop{\mathrm{argmax}}_k CQI_k,$$

and k represents the kth user.

8. The apparatus according to claim 5, wherein according to the transient CQI value and a scheduling algorithm, the schedule of the user to transmit data, comprises:
according to the transient CQI value and a proportional fairness (PF) algorithm, scheduling the user to transmit data, wherein the PF algorithm is:

$$k_* = \mathop{\mathrm{argmax}}_k \frac{R_k(t)}{T_k(t)},$$

wherein $R_k(t)$ is a data rate currently supported by the kth user, and related to the transient $CQI_k$ of the kth user, and $T_k(t)$ is an average rate of the kth user in a time window $T_w$.

* * * * *

UNITED STATES PATENT AND TRADEMARK OFFICE
CERTIFICATE OF CORRECTION

| | | |
|---|---|---|
| PATENT NO. | : 8,989,097 B2 | Page 1 of 1 |
| APPLICATION NO. | : 13/763170 | |
| DATED | : March 24, 2015 | |
| INVENTOR(S) | : Yi Wang et al. | |

It is certified that error appears in the above-identified patent and that said Letters Patent is hereby corrected as shown below:

<u>In the Claims</u>

In column 13, claim 5, line 7, after "at least one of:" insert --time--.

Signed and Sealed this
Twenty-eighth Day of July, 2015

Michelle K. Lee
*Director of the United States Patent and Trademark Office*